Feb. 10, 1942. R. S. BIGELOW 2,272,504
LOADING APPARATUS
Filed Sept. 4, 1940 4 Sheets-Sheet 2
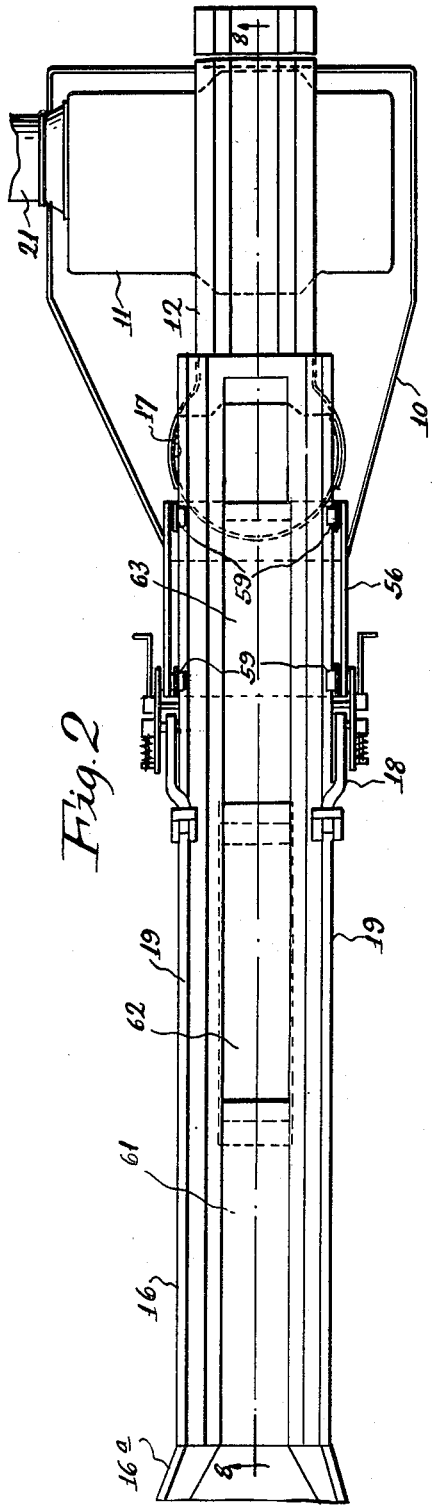
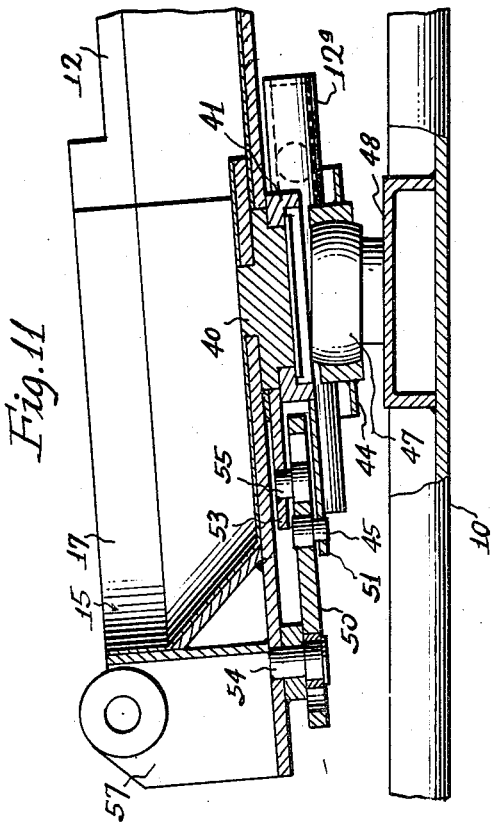
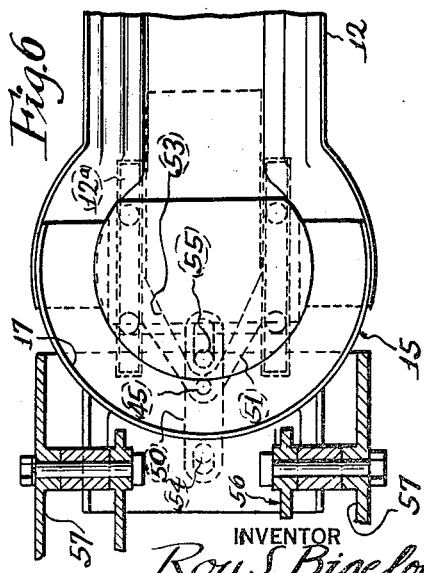
INVENTOR
Roy S. Bigelow
BY
Clarence F. Poole
ATTORNEY

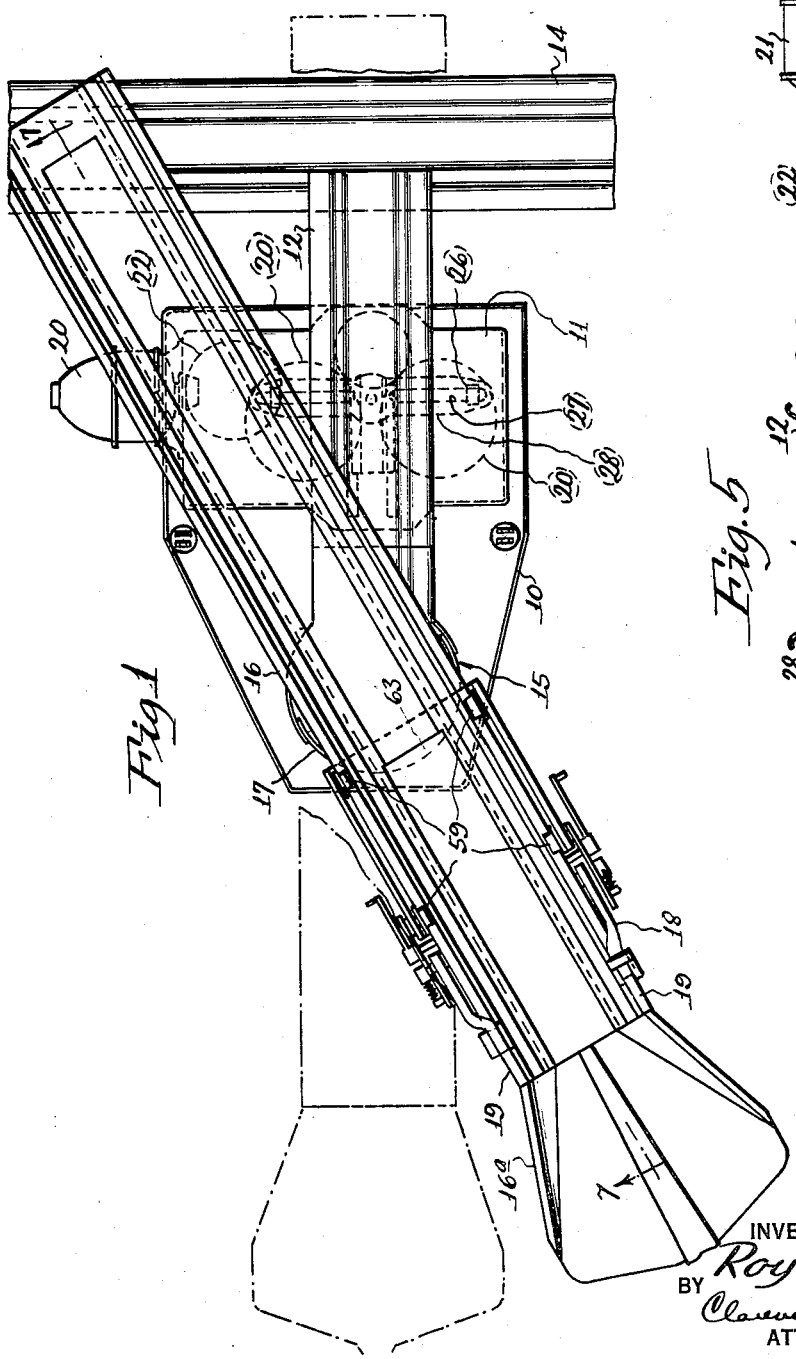

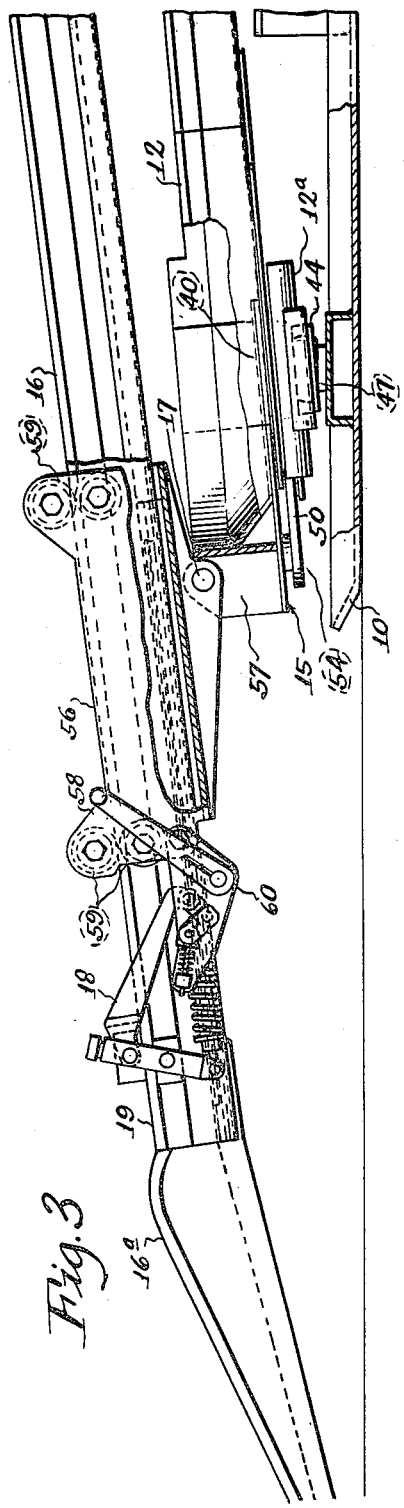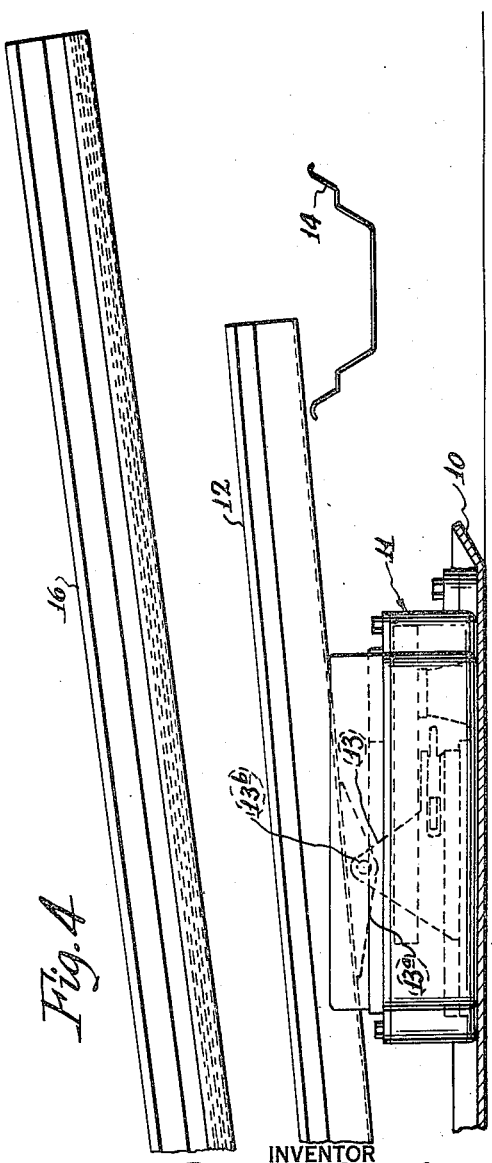

Feb. 10, 1942.  R. S. BIGELOW  2,272,504
LOADING APPARATUS
Filed Sept. 4, 1940  4 Sheets—Sheet 4
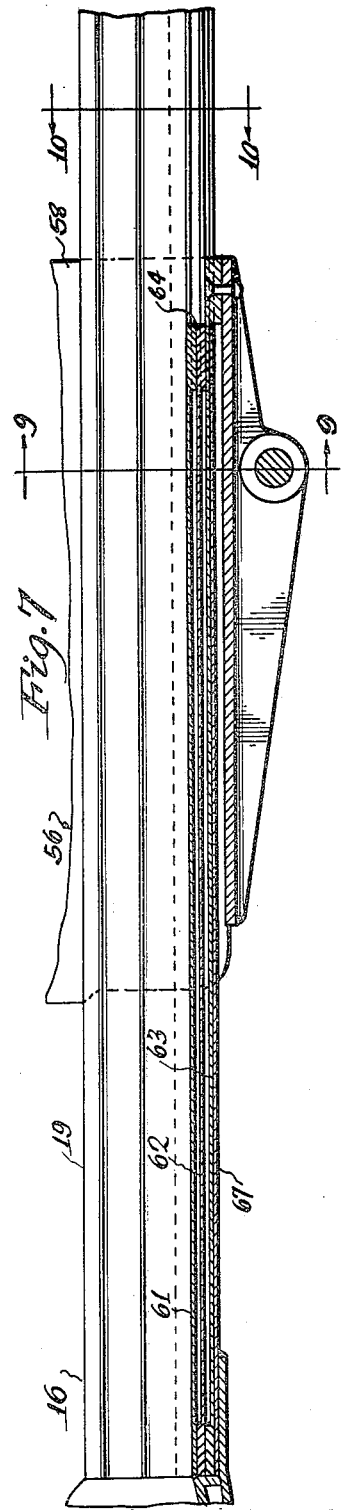
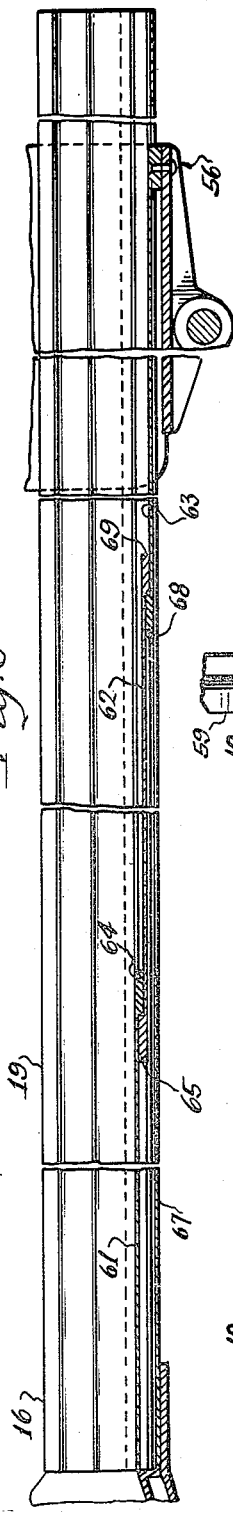
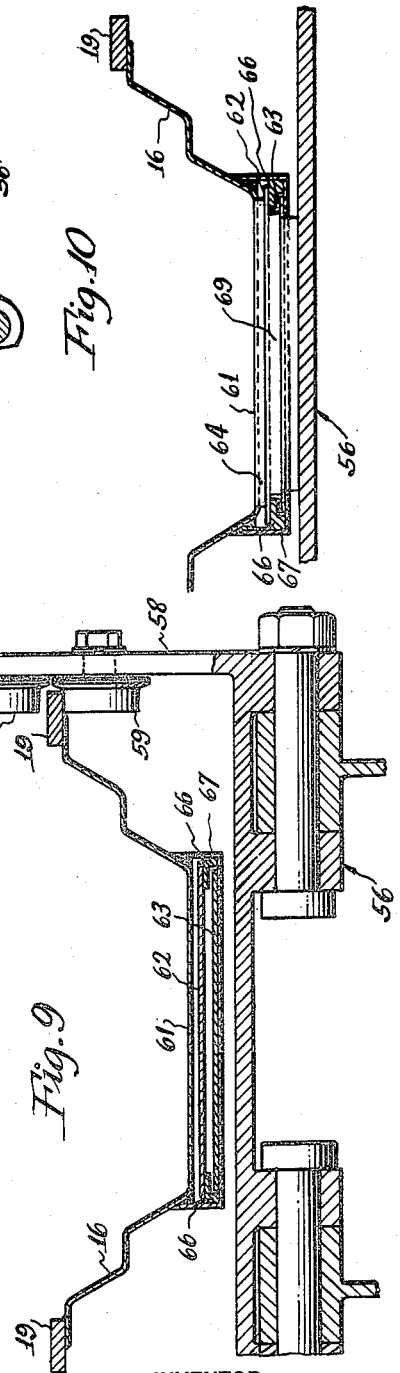
INVENTOR
Roy S. Bigelow
BY Clarence F. Poole
ATTORNEY Patented Feb. 10, 1942

2,272,504

UNITED STATES PATENT OFFICE 2,272,504

LOADING APPARATUS

Roy S. Bigelow, Chicago, Ill., assignor to Goodman Manufacturing Company, Chicago, Ill., a corporation of Illinois Application September 4, 1940, Serial No. 355,381

14 Claims. (Cl. 198—14)

This invention relates to improvements in loading apparatus and more particularly relates to a new and improved mobile loading apparatus of the shaker conveyer type particularly adapted to load material, such as coal, in mines underground.

In carrying out my invention I provide a mobile loading device independent of the main conveyer consisting of a reciprocating trough section reciprocably mounted on a base, for discharging into a main conveyer, and an extensible trough section having a pick-up shovel on the forward end thereof and mounted on said reciprocating trough section for extensible and lateral swinging movement with respect thereto. I also provide said extensible trough section with an extensible bottom arranged to assure the loading of material onto the reciprocating trough section, when said extensible trough section is in a retracted position with respect to said reciprocating trough section and its rear end projects beyond said reciprocating trough section, and when said extensible trough section is extended or positioned laterally with respect to said reciprocating trough section.

The principal objects of my invention are to provide a novel, compact and efficient form of independent loading unit for gathering and loading loose material, such as coal, onto a main conveyer, from various extreme positions with respect to the main conveyer, so arranged as to permit loading from breakthroughs at right angles to the main conveyer, or to permit loading directly in advance of the main conveyer, which includes a reciprocating trough section mounted on a base and an extensible trough section mounted on the reciprocating trough section for extensible and lateral swinging movement with respect thereto, and arranged to discharge material into said reciprocating trough section at substantially the same point, when in various extended or retracted positions with respect to said reciprocating trough section.

Other objects of my invention will appear from time to time as the following specification proceeds and with reference to the accompanying drawings wherein:

Figure 1 is a top plan view of a loading device constructed in accordance with my invention, arranged for discharging material into a main conveyer trough line and showing the extensible trough section in a fully retracted position;

Figure 2 is a plan view of the device shown in Figure 1, with the extensible trough section shown in an extreme extended position;

Figures 3 and 4 form an enlarged fragmentary view in side elevation of the device shown in Figure 1, with certain parts broken away and certain other parts shown in longitudinal section;

Figure 5 is an end view of the device shown in Figure 1, looking towards the forward end thereof, with certain parts broken away and certain other parts shown in transverse section;

Figure 6 is an enlarged fragmentary detail plan view, with the extensible trough section removed in order to show certain details of the swivel at the receiving end of the reciprocating trough section and the connection of the extensible trough section to the reciprocating trough section;

Figure 7 is a fragmentary sectional view taken substantially along line 7—7 of Figure 1;

Figure 8 is a fragmentary longitudinal sectional view taken substantially along line 8—8 of Figure 2;

Figure 9 is a transverse sectional view taken substantially along line 9—9 of Figure 7;

Figure 10 is a transverse sectional view taken substantially along line 10—10 of Figure 7; and Figure 11 is an enlarged partial fragmentary longitudinal sectional view, showing certain details of the swiveled connection between the extensible and reciprocating trough sections.

In the embodiment of my invention illustrated in the drawings, a base 10 for the gathering and loading device is provided, having a shaker conveyer drive mechanism 11 mounted thereon, adjacent the rear end thereof.

A reciprocating trough section 12 is mounted on said base, for reciprocable movement with respect thereto. As herein shown, said reciprocating trough section is mounted on a usual form of supporting ball frame 12a, adjacent its forward end, and is transversely pivoted to a drive member 13 of said drive mechanism, adjacent its rear end, on spaced depending ears 13a, 13a and a transversely extending pivotal pin 13b. The rear or discharge end of said reciprocating trough section projects beyond the rear of said base and overhangs a main conveyer line 14, for discharging material therein (see Figures 1 and 4).

The forward end of said reciprocating trough section has widened, outwardly curved, side walls and has a swiveling supporting section 15 mounted thereon. Said swiveling supporting section forms a horizontally swingable support for an extensible trough section 16, and forms a closure member for the forward end of said reciprocating trough section. Said supporting section has a curved forward wall 17, conforming to the form of the forward curved side walls of said reciprocating trough section, to follow the curved walls of said reciprocating trough section upon horizontal swiveling movement thereof, and to maintain the forward end of said reciprocating trough section closed, to form a closed receiving hopper when the swiveling and extensible trough sections are in various positions of adjustment with respect to said reciprocating trough section.

The extensible trough section 16 has a pick-up shovel 16a mounted on its forward end and is mounted on said swiveling supporting section for extensible or retractible movement with respect thereto and for pivotal movement with respect thereto about a transverse axis, in a manner which will hereinafter be more fully described as this specification proceeds. Said extensible trough section, as herein shown, is extended or retracted with respect to said reciprocating trough section by means of a friction grip feeding mechanism generally indicated by reference character 18, adapted to engage bearing plates 19, 19, projecting laterally from the upper edges of said extensible trough section. Said feeding mechanism may be of a type disclosed in the Bergmann Patent No. Re. 21,027 and is not herein shown or described in detail since it is no part of my present invention.

The conveyer drive mechanism 11, as herein shown, is of a low type similar to that disclosed by Patent No. 1,908,087, which issued to R. A. Walter on May 9, 1933, and also illustrated in my prior application Serial No. 266,054, which was filed April 5, 1939, so will not herein be described in detail. Said drive mechanism includes generally a pair of spaced apart oppositely rotating spur gears 20, 20, rotatable about vertical axes and driven from a motor 21 on the base 10, by means of a gear train generally indicated by reference character 22 (see Figure 5). A crank pin 25 is mounted on and depends from each spur gear 20. Each of said crank pins has a slide 26 mounted on the lower end thereof, which is slidably mounted in a slot 27 in a transversely extending bar 28. Said bar is pivotally mounted at its center on the drive member 13, for the trough section 12, and said drive member has a cross head 30 pivoted to its lower end and slidably mounted in a guide 31, extending along the bottom of the housing and base 10. Rotation of said gears will thus reciprocably move said drive member in such a manner as to cause material to move along the trough section 12 from the forward to rearward end thereof. If desired, a pair of winding drums (not shown) driven by said drive mechanism, may be provided for moving said loading device about the mine.

The swiveling supporting section 15 is pivotally connected to the forward end of said reciprocating trough section, by means of a bearing boss 40 mounted in a cross member 41 of the ball frame 12a. Said ball frame is of a usual construction arranged to slidably support and guide the reciprocating trough section. A lower frame member 44 of said ball frame is mounted on a bearing member 47, which has a bearing face of a semi-spherical construction, for mounting said lower frame member and ball frame to pivot with respect to said bearing member, in both horizontal and vertical planes. Said bearing member is mounted on a bracket 48 extending upwardly from the base 10 adjacent the forward end thereof.

A link 50 is pivotally connected intermediate its ends to a forwardly projecting portion 51 of the upper frame portion of the ball frame 12a on a pivotal pin 45 (see Figures 6 and 11). Opposite ends of said link are slotted and the forward slotted portion thereof is engaged by a pin 54 depending from the supporting section 15, adjacent the forward end thereof. The rear slotted portion of said link is engaged by a pin 55 depending from a member 53 spaced beneath the bottom of the supporting section 15 and secured to and projecting forwardly from the reciprocating trough section 12 and bearing boss 40. The purpose of said link is to pivot said ball frame laterally about the axes of the bearing members 40 and 47, upon lateral swinging movement of said extensible trough section, at an angle which is substantially half the angle of movement of said extensible trough section, to reduce the side thrusts on said extensible trough section and to cause the conveying action of said extensible trough section to be similar to that of said reciprocating trough section, when in various positions of adjustment with respect thereto, as disclosed in Patent No. 2,129,809 which issued to E. R. Bergmann on September 13, 1938.

The extensible trough section 16 is slidably mounted on a support and guiding member 56, which is transversely pivoted to the swiveling supporting section 15 on laterally spaced upright ears 57, 57, disposed adjacent the forward end of said supporting section, to permit vertical movement of said extensible trough section so the shovel 16a on the forward end thereof may follow an uneven bottom, for picking up material therefrom.

The supporting and guiding member 56 is provided with a pair of laterally spaced upright side walls 58, 58 extending upwardly along opposite sides of the trough section 16 and having pairs of vertically spaced rollers 59, 59 mounted adjacent the forward and rear ends thereof, to form a rolling support for the bearing flanges of said extensible trough section and to prevent tilting movement thereof with respect to said guiding member. The feeding mechanism 18 projects forwardly from and is pivotally connected to said guiding member by means of a pair of oppositely disposed connecting links 60, 60, projecting forwardly from and transversely pivoted to the forward ends of said side walls.

Referring now in particular to Figures 7 to 10 inclusive and the novel bottom construction of the extensible trough section 16, said bottom includes a plurality of telescopic plates 61, 62 and 63. The plate 61 forms a normal bottom for the forward end of said extensible trough section and has a depending gib 64 at the rear end thereof, adapted to engage a gib 65 projecting upwardly from the forward end of the plate 62. The plate 62 is slidably supported on the upper sides of guide members 66, 66, mounted in an under frame 67 extending along the forward portion of said extensible trough section. Said guide members with the top of the bottom portion of said underframe form channeled guides for the plate 63, which is secured to and projects forwardly from the supporting and guiding member 56. The plate 63 is provided with an upwardly projecting gibbed forward end 68, adapted to engage a depending gibbed rear end 69 of the plate 62. Thus, when said extensible trough section is extended from the position shown in Figures 1 and 7 to that shown in Figures 2 and 8, the gib 64 will engage the gib 65 and extend the bottom plate 62 until the gib 69 engages the gib 68, which serves as a stop for said bottom plate. As said extensible trough section is retracted, the bottom plate 61 will slidably move along the bottom plate 62 in a rearward direction until the forward end of the underframe 67 engages the forward end of the bottom plate 62. Said bottom plate will then slidably move along the bottom plate 63 until the forward end of the underframe 67 engages the forward end of said last named bottom plate, at which time said bottom will be in the fully retracted position shown in Figures 1 and 7.

It may be seen from the foregoing that the extensible trough section is so arranged that it will always discharge into the hopper-like forward end of the reciprocating trough section, when said extensible trough section is laterally positioned with respect to said reciprocating trough section, or is in various extended or retracted positions with respect to said reciprocating trough section. It may further be seen that this arrangement permits the construction of a compact loading unit which may pick up material from a position relatively close to the main conveyer at various angular positions with respect thereto, and which may be extended and swung laterally to permit the gathering of material from a relatively wide working place without moving the base for the loading unit.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an apparatus for loading material in mines, a base, a trough section mounted on said base for reciprocable movement with respect thereto, and an extensible trough section operatively connected with said reciprocating trough section and mounted for extensible and lateral swinging movement with respect to said reciprocating trough section and base and arranged to discharge material into said reciprocating trough section when in various positions of extension or lateral swinging movement with respect thereto.

2. In an apparatus for loading material in mines, a base, a trough section mounted on said base for reciprocable movement with respect thereto, and an extensible trough section operatively connected with said reciprocating trough section and mounted for extensible and lateral swinging movement with respect to said reciprocating trough section and base, said reciprocating trough section having a widened hopper-like forward end and said extensible trough section being arranged to discharge material into said hopper-like forward end of said reciprocating trough section at substantially the same place, when positioned laterally with respect to said reciprocating trough section and when in various extended or retracted positions with respect to said reciprocating trough section.

3. In an apparatus for loading material in mines, a base, a trough section mounted on said base for reciprocable movement with respect thereto, and an extensible trough section operatively connected with said reciprocating trough section and mounted for extensible and lateral swinging movement with respect to said reciprocating trough section and base, said reciprocating trough section having a widened hopper-like forward end and said extensible trough section being arranged to discharge material into said hopper-like forward end of said reciprocating trough section at substantially the same place, when positioned laterally with respect to said reciprocating trough section and when in various extended or retracted positions with respect to said reciprocating trough section, and said extensible trough section having a rear bottom portion adapted to move telescopically with respect to the forward bottom portion thereof.

4. In an apparatus for loading material in mines, a base, a trough section mounted on said base for reciprocable movement with respect thereto, and an extensible trough section mounted adjacent the forward end of said reciprocating trough section, for extensible and lateral swinging movement with respect to said reciprocating trough section and base, and operatively connected with said reciprocating trough section, said extensible trough section having an extensible bottom adapted to be extended along said extensible trough section as said trough section is advanced for loading and to telescope as said trough section is moved to a retracted position, to permit material to be loaded into said reciprocating trough section in all positions of adjustment of said extensible trough section with respect to said reciprocating trough section.

5. In an apparatus for loading material in mines, a base, a trough section mounted on said base for reciprocable movement with respect thereto, and an extensible trough section mounted adjacent the forward end of said reciprocating trough section, for extensible and lateral swinging movement with respect to said reciprocating trough section and base, and operatively connected with said reciprocating trough section, said extensible trough section having an extensible bottom adapted to be extended along said extensible trough section as said trough section is advanced for loading and to telescope as said trough section moves to a retracted position, to permit material to be loaded into said reciprocating trough section in all positions of adjustment of said extensible trough section with respect to said reciprocating trough section, said extensible bottom including a rear end section fixed from extensible movement with respect to said reciprocating trough section and an intermediate section guided for extensible or retractible movement with respect to said rear end section.

6. In an apparatus for loading material in mines, a base, a trough section mounted on said base for reciprocable movement with respect thereto, and an extensible trough section mounted adjacent the forward end of said reciprocating trough section, for extensible and lateral swinging movement with respect to said reciprocating trough section and base, and operatively connected with said reciprocating trough section, said extensible trough section having an extensible bottom adapted to be extended along said extensible trough section as said trough section is advanced for loading and to telescope as said trough section moves to a retracted position, to permit material to be loaded into said reciprocating trough section in all positions of adjustment of said extensible trough section with respect to said reciprocating trough section, said extensible bottom including a forward end section forming a normal bottom for said extensible trough section, a rear end section fixed from extensible movement with respect to said reciprocating trough section, and an intermediate section guided for extensible or retractible movement with respect to said forward and rear bottom sections.

7. In an apparatus for loading material in mines, a base, a trough section mounted on said base for reciprocable movement with respect thereto, a supporting and guiding member mounted adjacent the forward end of said reciprocating trough section for lateral pivotal movement with respect thereto and operatively connected therewith, and an extensible trough section mounted on said supporting and guiding member for extensible and retractible movement with respect thereto, and arranged to discharge material into said reciprocating trough section at substantially the same point, when positioned laterally with respect thereto and when in various extended or retracted positions with respect thereto.

8. In an apparatus for loading material in mines, a base, a trough section mounted on said base for reciprocable movement with respect thereto, a supporting and guiding member mounted adjacent the forward end of said reciprocating trough section for lateral pivotal movement with respect thereto and operatively connected therewith, and an extensible trough section mounted on said supporting and guiding member for extensible and retractible movement with respect thereto, said extensible trough section having an extensible bottom adapted to permit the discharge of material into said reciprocating trough section at substantially the same point when laterally positioned with respect thereto and when in various extended or retracted positions with respect thereto.

9. In an apparatus for loading material in mines, a base, a trough section mounted on said base for reciprocable movement with respect thereto, a supporting and guiding member mounted adjacent the forward end of said reciprocating trough section for lateral pivotal adjustment with respect thereto and reciprocably driven thereby and an extensible trough section mounted on said supporting and guiding member for extensible and retractible movement with respect thereto, said extensible trough section having an extensible bottom adapted to permit the discharge of material into said reciprocating trough section at substantially the same point when laterally positioned with respect thereto and when in various extended or retracted positions with respect thereto, and said extensible bottom including a rear bottom section fixed to said supporting and guiding member and having the lower portion of said extensible trough section slidably guided for movement therealong.

10. In an apparatus for loading material in mines, a base, a trough section mounted on said base for reciprocable movement with respect thereto, a supporting and guiding member mounted adjacent the forward end of said reciprocating trough section for lateral pivotal adjustment with respect thereto and reciprocably driven thereby, and an extensible trough section mounted on said supporting and guiding member for extensible and retractible movement with respect thereto, said extensible trough section having an extensible bottom adapted to permit the discharge of material into said reciprocating trough section at substantially the same point when laterally positioned with respect thereto and when in various extended or retracted positions with respect thereto, and said extensible bottom including a rear bottom section fixed to said supporting and guiding member and having the lower portion of said extensible trough section slidably guided for movement therealong, and an intermediate bottom section guided for extensible and retractible movement with respect to said rear end section and with respect to the forward bottom portion of said extensible trough section.

11. In an apparatus for loading material in mines, a base, a trough section mounted on said base for reciprocable movement with respect thereto, means mounted on said base for reciprocably driving said trough section, said trough section having a widened forward end with outwardly curved side walls, a swiveling supporting section pivotally mounted at the forward end of said reciprocating trough section and having curved side walls conforming to the form of said outwardly curved side walls of said reciprocating trough section and having interengaging connection therewith, to form a closed hopper when in various positions of lateral adjustment with respect thereto, a supporting and guiding member transversely pivoted on said swiveling supporting section, and an extensible trough section reciprocably driven by and mounted on said supporting and guiding member, for slidable movement therealong, and arranged to discharge material into said reciprocating trough section when in various extended or retracted positions with respect thereto.

12. In an apparatus for loading material in mines, a base, a trough section mounted on said base for reciprocable movement with respect thereto, means mounted on said base for reciprocably driving said trough section, said trough section having a widened forward end with outwardly curved side walls, a swiveling supporting section pivotally mounted at the forward end of said reciprocating trough section and having curved side walls conforming to the form of said outwardly curved side walls of said reciprocating trough section and having interengaging connection therewith, to form a closed hopper when in various positions of lateral adjustment with respect thereto, a supporting and guiding member transversely pivoted on said swiveling supporting section, and an extensible trough section reciprocably driven by and mounted on said supporting and guiding member, for slidable movement therealong, and having an extensible bottom adapted to permit the discharge of material into said reciprocating trough section at substantially the same point when laterally positioned with respect thereto and when in various extended or retracted positions with respect thereto.

13. In an apparatus for loading material in mines, a base, a trough section mounted on said base for reciprocable movement with respect thereto, means mounted on said base for reciprocably driving said trough section, said trough section having a widened forward end with outwardly curved side walls, a swiveling supporting section pivotally mounted at the forward end of said reciprocating trough section and having curved side walls conforming to the form of said outwardly curved side walls of said reciprocating trough section and having interengaging connection therewith, to form a closed hopper when in various positions of lateral adjustment with respect thereto, a supporting and guiding member transversely pivoted on said swiveling supporting section, and an extensible trough section reciprocably driven by and mounted on said supporting and guiding member, for slidable movement therealong, and having an extensible bottom adapted to permit the discharge of material into said reciprocating trough section at substantially the same point when laterally positioned with respect thereto or when in various extended or retracted positions with respect thereto, and said extensible bottom including a rear bottom section fixed to said supporting and guiding member and having the lower portion of said extensible trough section slidably guided for movement therealong.

14. In an apparatus for loading material in mines, a base, a trough section mounted on said base for reciprocable movement with respect thereto, means mounted on said base for reciprocably driving said trough section, said trough section having a widened forward end with outwardly curved side walls, a swiveling supporting section pivotally mounted at the forward end of said reciprocating trough section and having curved side walls conforming to the form of said outwardly curved side walls of said reciprocating trough section and having interengaging connection therewith, to form a closed hopper when in various lateral swinging positions of adjustment with respect thereto, a supporting and guiding member mounted on said swiveling supporting section, for transverse pivotal movement with respect thereto, and an extensible trough section reciprocably driven by and mounted on said supporting and guiding member for slidable movement therealong and having an extensible bottom adapted to permit the discharge of material into said reciprocating trough section at substantially the same point when laterally positioned with respect thereto or when in various extended or retracted positions with respect thereto, said extensible bottom including a rear bottom section fixed to said supporting and guiding member and having the lower portion of said extensible trough section slidably guided for movement therealong, and an intermediate bottom section guided for extensible and retractible movement with respect to said rear end section and with respect to the forward bottom portion of said extensible trough section.

ROY S. BIGELOW.